United States Patent
Tokutake et al.

(10) Patent No.: US 6,284,203 B1
(45) Date of Patent: Sep. 4, 2001

(54) OZONIZER DISCHARGE CELL AND ITS MANUFACTURING METHOD

(75) Inventors: Shigekazu Tokutake; Kyoji Shimoda, both of Hyogo (JP)

(73) Assignee: Sumitomo Precision Products Co., Ltd., Amagasaki (JP)

( * ) Notice: Subject to any disclaimer, the term of this patent is extended or adjusted under 35 U.S.C. 154(b) by 0 days.

(21) Appl. No.: 09/187,828

(22) Filed: Nov. 9, 1998

(30) Foreign Application Priority Data

Jun. 24, 1998 (JP) .................................................. 10-096702

(51) Int. Cl.[7] ................ B01J 19/08; B01J 19/12
(52) U.S. Cl. ................ 422/186.07; 422/186.07; 422/186.12; 264/510
(58) Field of Search ........................ 422/186.07; 264/510

(56) References Cited

U.S. PATENT DOCUMENTS 5,879,641 * 3/1999 Conrad ........................... 422/186.07
5,932,180 * 8/1999 Zhang ............................. 422/186.07
5,948,374 * 9/1999 Kuzumoto ...................... 422/186.07
5,985,068 * 11/1999 Kawakami ......................... 156/89.18

* cited by examiner

Primary Examiner—Kathryn Gorgos
Assistant Examiner—J. Maisano
(74) Attorney, Agent, or Firm—Oblon, Spivak, McClelland, Maier & Neustadt, P.C.

(57) ABSTRACT

A plate-type-ozonizer discharge cell including a pair of planar electrodes separated by a dielectric to ozonize a material gas circulating through a discharge space formed between one of the planar electrodes and the dielectric by way of discharge. In addition, the dielectric includes at least one ceramic block having a plurality of ceramic layers integrally superimposed on each other in a layer thickness direction. Also included is a method of manufacturing an ozonizer discharge cell, which includes providing a plurality of ceramic sheets to be baked, and superimposing the ceramic sheets in a layer thickness direction. Then the plurality of ceramic layers are baked so as to form a ceramic block.

11 Claims, 6 Drawing Sheets

*FIG. 8*
*BACGROUND ART*

OZONIZER DISCHARGE CELL AND ITS MANUFACTURING METHOD

BACKGROUND OF THE INVENTION

1. Field of the Invention

The present invention relates to a discharge cell used for a plate-type ozonizer and its manufacturing method.

2. Discussion of the Background

Figure 8:
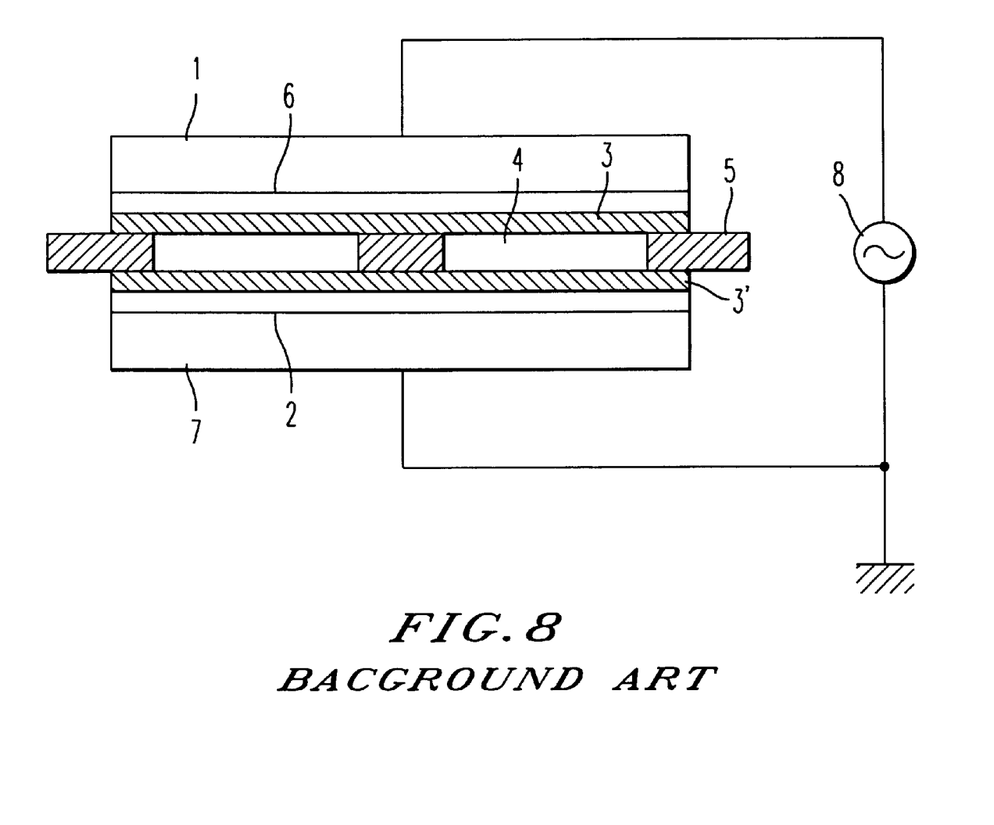
FIG. 8 is a sectional view of a conventional discharge cell.

FIG. 8 shows a conventional discharge cell used for a plate-type ozonizer. The discharge cell includes a planar high-voltage electrode 1 and a planar ground electrode 2 arranged so as to face each other at a predetermined interval. Dielectrics 3 and 3' are formed on the facing surfaces of the high-voltage electrode 1 and ground electrode 2 by means of coating. Moreover, a spacer 5 is set between the dielectrics 3 and 3' to form a discharge space 4 having a predetermined gap.

In addition, heat sinks 6 and 7 are included in close contact on the outside of the high-voltage electrode 1 and ground electrode 2. The heat sink 6 at the high-voltage electrode 1 is connected with a high-voltage terminal of a high-voltage power supply 8 and the heat sink 7 at the ground electrode 2 is ground together with a ground terminal of the high-voltage power supply 8.

To produce ozone, a high voltage is applied between the high-voltage electrode 1 and the ground electrode 2 by the high-voltage power supply 8 connected to the beat sinks 6 and 7. Thus, a silent discharge is generated in the discharge space 4 between the dielectrics 3 and 3'. By circulating a material gas, such as an oxygen gas or air through the discharge space 4 under the above state, some of the material gas is exposed to the silent discharge and ozonized.

A plate-type ozonizer frequently uses a plurality of the above-mentioned discharge cells by using each discharge cell as one module and superimposing the discharge cells in a thickness direction.

However, the above conventional ozonizer discharge cell has the following problems.

To form the discharge space 4 having the predetermined gap between the dielectrics 3 and 3', the spacer 5 is set between the dielectrics 3 and 3'. The spacer 5 includes an elastic silicon sheet to protect the dielectrics 3 and 3' from a tightening force when superimposing a plurality of discharge cells. This is because, if the spacer 5 is hard, the dielectrics 3 and 3' may be broken due to the force produced when a plurality of discharge cells are superimposed and tightened.

In addition, ozone has an oxidation capacity similar to that of fluorine among natural oxidizing agents. Therefore, even though a silicon sheet is superior in oxidation resistance, the silicon sheet is unavoidably changed in properties or deteriorated in quality due to the oxidation capacity after exposure to ozone for a long time. Thus, a conventional discharge cell has a durability problem.

In addition, the spacer 5 is bonded to the dielectrics 3 and 3' by an adhesive to secure an airtightness of the discharge space 4. However, because the bonding force is not large, a pressure of a material gas circulating through the discharge space 4 is limited.

Further, the high-voltage electrode 1 and ground electrode 2 produce heat from the discharge energy of the generated silent discharge. This heat causes a lower ozone producing efficiency because the heat accelerates a dissolution of produced ozone. To improve the above problem, the heat sinks 6 and 7 are placed directly on the high-voltage electrode 1 and ground electrode 2 or are placed on the electrodes 1 and 2 through a sheet, such as an aluminum foil which is superior in heat conductivity.

In this case, the heat sink 7 at the ground electrode 2 is a water-cooled type having a high cooling efficiency. In addition, the heat sink 6 at the high-voltage electrode 1 is an air-cooled type to prevent a short circuit due to cooling water having a low insulation resistivity. However, the air-cooled type heat sink is inferior to the water-cooled type in cooling efficiency. Therefore, in the case of a conventional discharge cell, the ozone producing efficiency is unavoidably lowered.

Moreover, the heat sinks 6 and 7 are large compared to other component members and the air-cooled-type heat sink 6 is particularly large. Therefore, it is difficult to reduce a size of a discharge cell.

SUMMARY OF THE INVENTION

Accordingly, one object of this invention is to provide an ozonizer discharge cell superior in durability.

Another object of the present invention is to provide an ozonizer which uses a high material-gas pressure. Yet another object of the present invention is to provide an ozonizer which is compact and has a high ozone producing efficiency.

Still another object of the present invention is to provide a novel manufacturing method for producing an ozonizer discharge cell.

To achieve the above-mentioned objects, a plate-type-ozonizer discharge cell includes a pair of planar electrodes separated by a dielectric to ozonize a material gas circulating through a discharge space formed between one of the planar electrodes and the dielectric by means of discharge. In addition, the dielectric includes at least one ceramic block having a plurality of ceramic layers integrally superimposed on each other in a layer thickness direction. In addition, the method of manufacturing an ozonizer discharge cell, includes providing a plurality of ceramic sheets to be baked, and superimposing the ceramic sheets in a layer thickness direction. Then the plurality of ceramic layers are baked so as to form a ceramic block.

Figure 3:
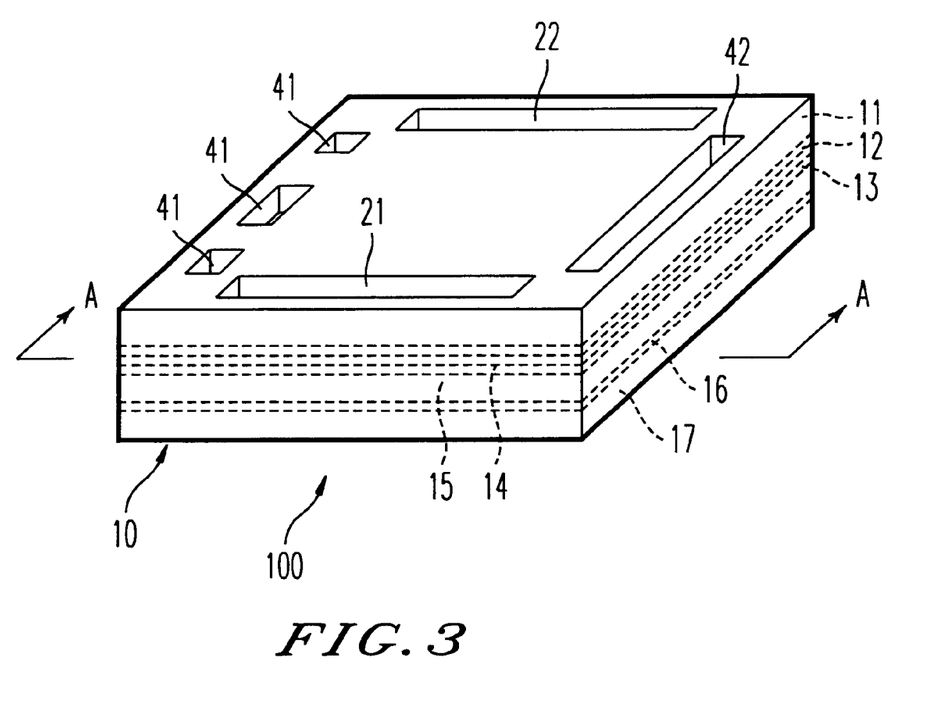
FIG. 3 is a perspective view of a discharge cell of the ozonizer in FIG. 1.
Figure 4:
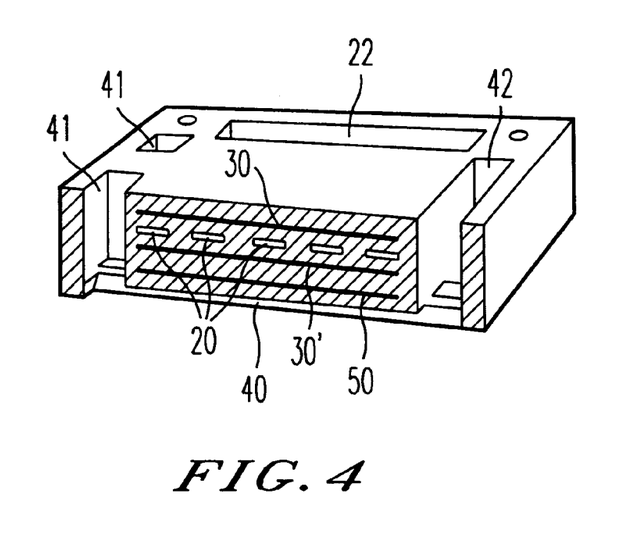
FIG. 4 is a sectional view of the ozonizer in FIG. 3, taken along a line A—A in FIG. 3.
Figure 5:
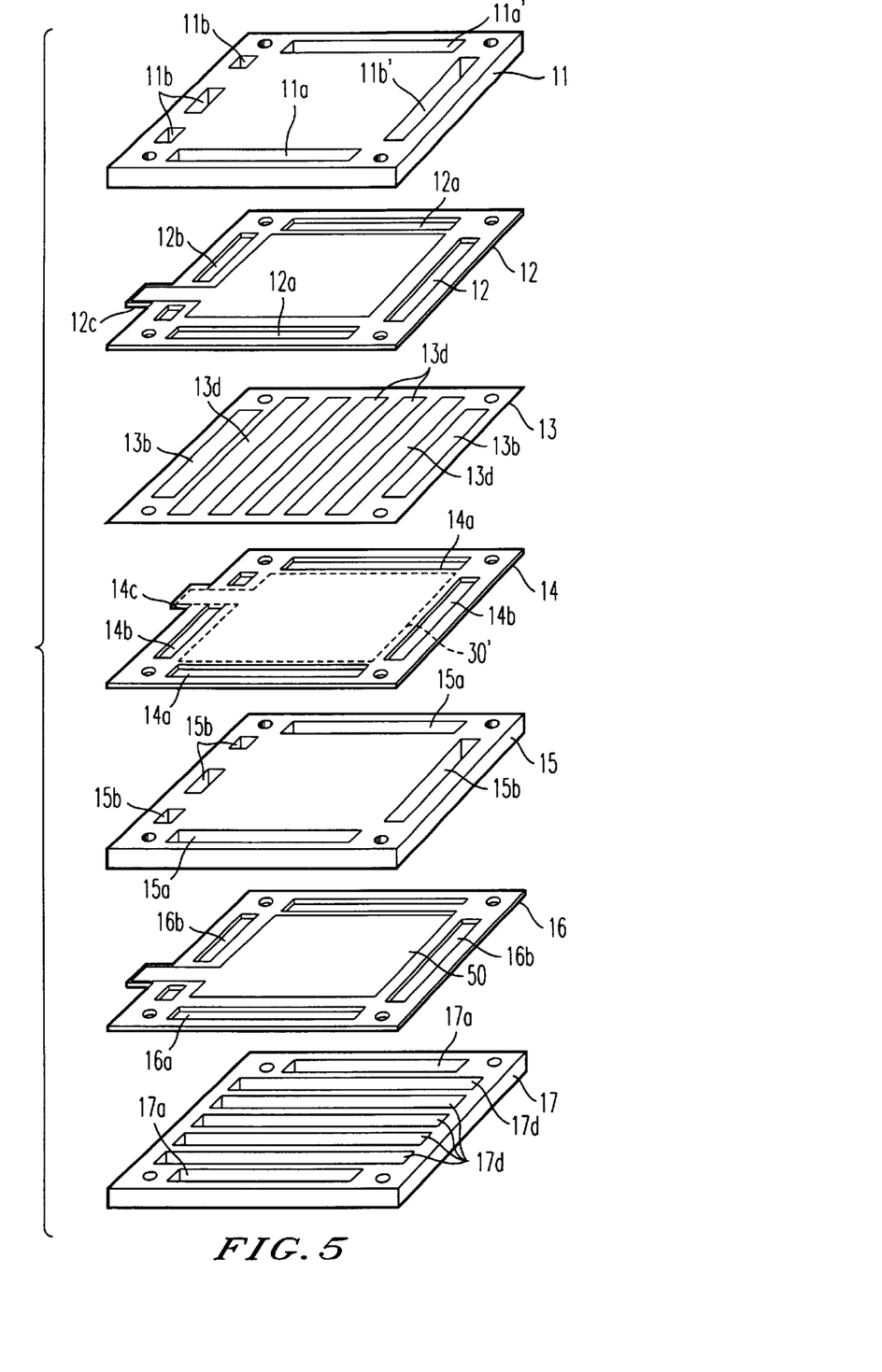
FIG. 5 is a disassembled perspective view of a plurality of ceramic layers forming the discharge cell in FIG. 1.

Specifically, as shown in FIGS. 3 to 5, an ozonizer discharge cell of the present invention includes a ceramic block 10 formed by integrally superimposing a plurality of ceramic layers 11, 12, etc., in a thickness layer direction. A discharge space 20 is formed between two ceramic layers 12 and 14 at both sides of an intermediate ceramic layer 13. The intermediate layer 13 serves as a spacer in the ceramic block 10. In addition, two planar electrodes 30 and 30' are formed at both sides of the discharge space 20 at the anti-void side (i.e., a side facing opposite to the discharge space) ofthe two ceramic layers 12 and 14. The planar electrodes 30 and 30' are respectively sealed between adjacent ceramic layers 11 and 12 and between adjacent ceramic layers 14 and 15.

For the discharge cell shown in FIGS. 3 to 5, the ceramic layers 12 and 14 facing the discharge space 20 function as dielectrics, thereby discharge occurs in the discharge space 20. Thus, some of a material gas circulating through the discharge space 20 is ozonized. In this case, the intermediate ceramic layer 13 serves as a spacer and forms the discharge space 20. Therefore, even if the spacer is exposed to ozone for a long time, the spacer is not changed in properties or deteriorated in quality.

Because the pair of ceramic layers 12 and 14 at both sides of the intermediate ceramic layer 13 are integrated by being superimposed with the intermediate ceramic layer 13 and other ceramic layers, a thickness of the ceramic material at a tightening portion increases. Therefore, even though the spacer is made with a hard ceramic layer 13, the ceramic layers 12 and 14, as well as other ceramic layers including the ceramic layer 13, are not broken even if the tightening force is increased. Accordingly, an ozonizer discharge cell of the present invention is superior in durability.

Moreover, because the ceramic layers 12, 13 and 14 are integrated, the discharge space 20 formed between the ceramic layers 12 and 14 is superior in airtightness. Therefore, it is also possible to use a high material-gas pressure.

In addition, the planar electrodes 30 and 30' are cooled because a ceramic layer serves as an electric insulating layer. Moreover, similarly to the case of the discharge space 20, a thin coolant circulation route 40 is formed by using a ceramic layer as a spacer. Therefore, efficient cooling at the high-voltage electrode side may be achieved using water. Further, this cooling structure does not significantly increase a size of the ozonizer discharge cell. Therefore, an ozonizer discharge cell of the present invention is downsized and it is possible to secure a high ozone producing efficiency.

Though the planar electrodes 30 and 30' may be a conductive plate, it is preferable to use a conductive thin film formed on a surface of a ceramic layer through metallization. This is because the conductive film may be integrated through a print baking process. In addition, it is possible to form the thin film on the surfaces of the ceramic layers 12 and 14. Moreover, it is possible to form the thin film on the surfaces of the two ceramic layers 11 and 15 facing the discharge space. In any case, a formed thin film is sealed between the ceramic layers 11 and 12 and between the ceramic layers 14 and 15. Because the thin film is sealed between ceramic plates, the withstand voltage between a peripheral electrode and another component is improved, as well as improving the assembling characteristic due to a decrease in the number of parts required for assembling. In addition, one of the planar electrodes 30 and 30' may be exposed to the discharge space 20.

Further, it is preferable to form a gas introduction route 21 for introducing a material gas into the discharge space 20 and a gas discharge route 22 for discharging ozone gas produced in the discharge space 20. This may be achieved by penetrating a plurality of ceramic layers 11, 12, etc., in the layer thickness direction. In this case, the ozonizer discharge cell is simpler to manufacture and may be reduced in size.

Similarly, it is preferable to form a coolant introduction route 41 for introducing a coolant into a coolant circulation route 40 and a coolant discharge route 42 for discharging the coolant. This may be achieved by penetrating a plurality of ceramic layers 11, 12, etc., in the layer thickness direction. Again, the ozonizer is simpler to manufacture and may be reduced in size.

The discharge space 20 and coolant circulation route 40 include a plurality of circulation routes divided in a direction perpendicular to the circulation direction as shown in FIGS. 3 to 5. This is preferable to achieve a uniform distribution of fluid. The discharge space 20 is preferable in that a gap can be accrately held and moreover, creeping discharge can be expected.

The ozonizer discharge cells may be easily manufactured by a method of processing and/or treating a plurality of ceramic sheets before a baking process. That is, a plurality of ceramic sheets corresponding to a plurality of ceramic layers 11, 12, etc., forming the ceramic block 10 may be manufactured. The ceramic sheets can be superimposed and baked into the ceramic block 10.

Ceramic materials which may be used include sapphire, alumina, or zirconia. A particularly preferable ceramic material is one which includes alumina of 90% or more which can be integrally baked with an electrode.

For the discharge cell shown in FIGS. 3 to 5, the ceramic layers 12 and 14 facing the discharge space 20 function as dielectrics. It is preferable to coat the ceramic layer surface contacting the discharge space 20 with $SiO_2$. This is because, even though the ozone producing efficiency and ozone concentration stability may be lowered by using a ceramic layer as a dielectric, the $SiO_2$ coating increases the producing efficiency and ozone concentration. Though the reason is not certain, it is estimated that the rough surface of a ceramic layer is smoothed by coating the surface with $SiO_2$. This coating film may be easily formed by applying $SiO_2$ paste to the surface of a ceramic sheet and then baking the paste together with the ceramic sheet. Moreover, the film may also be easily formed by thermally spraying $SiO_2$ on the ceramic sheet after the ceramic sheet is baked.

In addition, it is preferable that the gap of the discharge space 20 of an ozonizer discharge cell be decreased in size. This is because the cooling efficiency in the discharge space 20 is improved by narrowing the gap of the discharge space 20. Therefore, the concentration of ozone gas may be increased and a discharge effect suitable for producing ozone may be obtained in accordance with an electron energy level.

Figure 6:
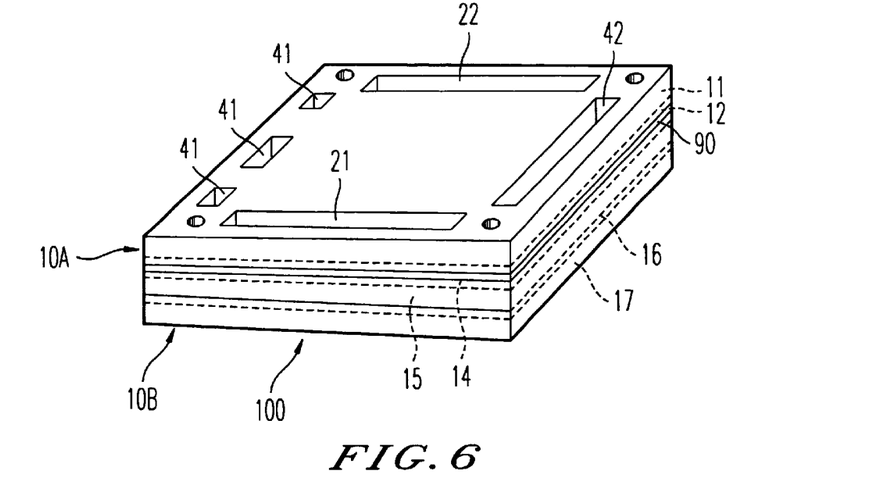
FIG. 6 is a perspective view of the discharge cell of yet another embodiment of the present invention.
Figure 7:
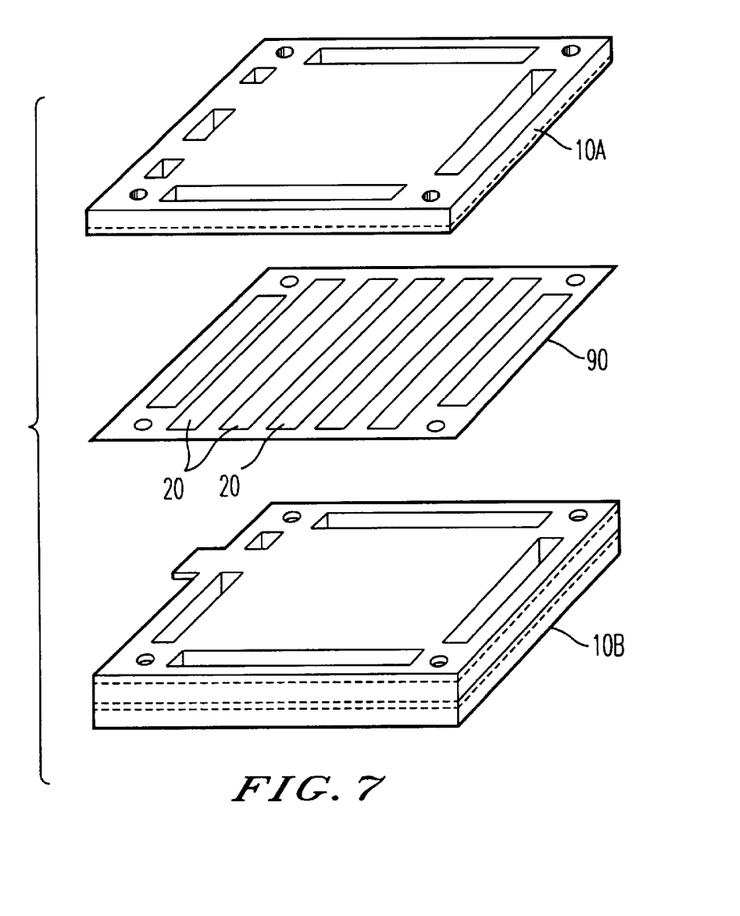
FIG. 7 is an exploded perspective view of the discharge cell in FIG. 6.

For the case of the discharge cell shown in FIGS. 3 to 5, the gap size of the discharge space 20 is determined by the thickness of the ceramic layer 13. Therefore, it is possible to secure a thickness of up to approximately 0.1 mm. However, when a ceramic sheet is used, it is difficult to realize a gap size of 0.1 mm or less. To secure a gap size of 0.1 mm or less, a structure which includes two joined ceramic blocks 10A and 10B is preferable, as shown in FIGS. 6 and 7. The ceamic blocks 10A and 10B include a plurality of ceramic layers 11, 12, etc., which are integrally superimposed on each other in the layer thickness direction with a glass layer 90 serving as a spacer. The glass layer 90 also includes a bonding layer which bonds the ceramic blocks 10A and 10B. By using the glass layer 90, it is possible to form the discharge space 20 having a gap size of 0.1 mm or less. Moreover, the discharge cell in FIGS. 6 and 7 is similar to the discharge cell in FIGS. 3 to 5, except that the ceramic layer 13 is replaced with the glass layer 90.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE PREFERRED EMBODIMENTS

Figure 1:
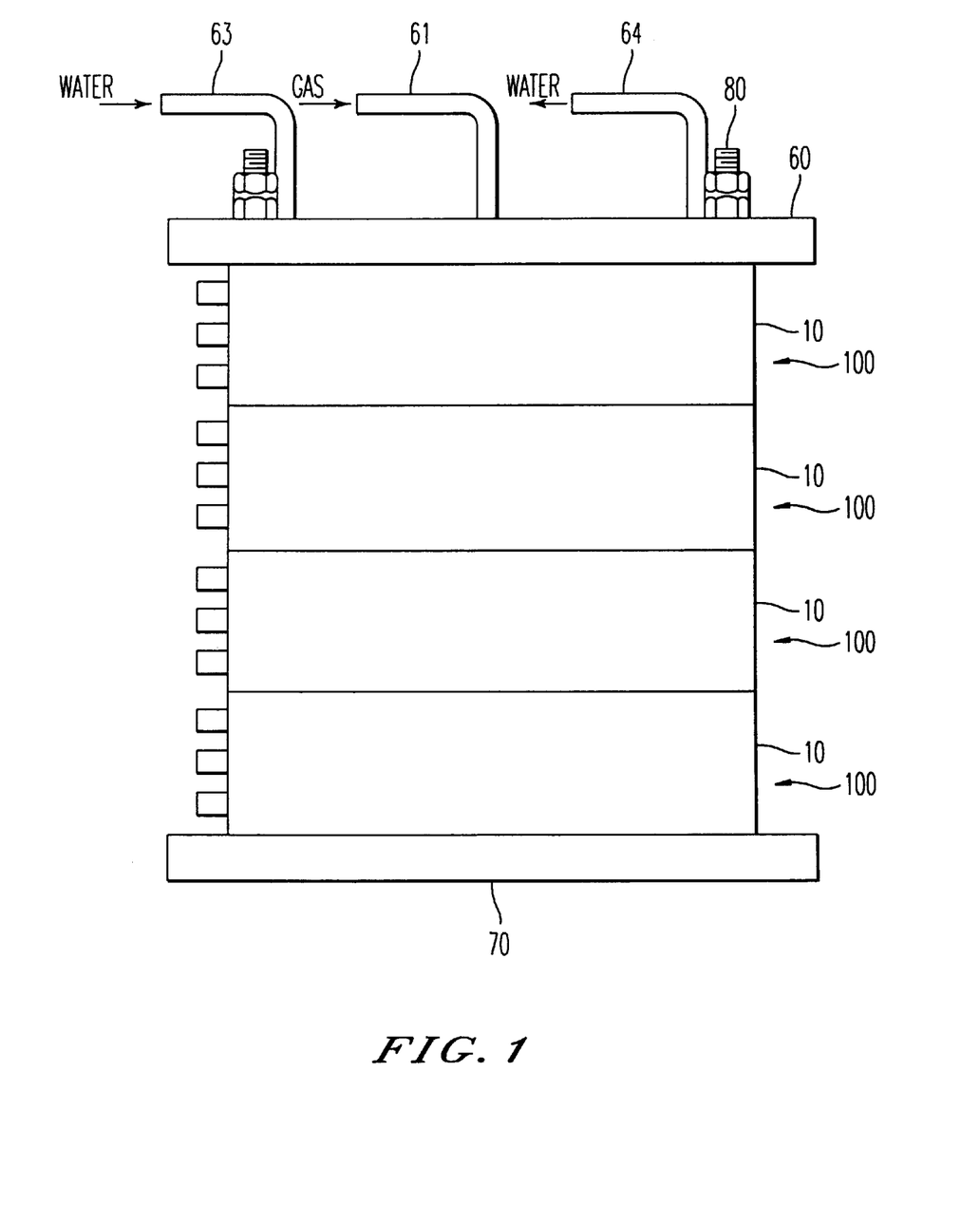
FIG. 1 is a side view of an ozonizer using a discharge cell of an embodiment of the present invention.

Referring now to the drawings, wherein like reference numerals designate identical or corresponding parts throughout the several views, and more particularly to FIG. 1 thereof, there is illustrated an ozonizer formed by superimposing a plurality of discharge cells 100 (4 discharge cells in FIG. 1), and setting the cells between top and bottom end plates 60 and 70. The discharge cells are secured between the end plates 60 and 70 by four tie rods 80 (only two tie rods are illustrated in FIG. 1) penetrating four corners of the end plates 60 and 70.

As shown in FIGS. 3 to 5, each discharge cell 100 includes a compressed rectangular-parallelepiped ceramic block 10. The ceramic block 10 is formed by integrally superimposing seven ceramic layers 11 to 17 in a layer thickness direction. Each ceramic layer is a square thin plate. The structure of each ceramic layer is described later. In FIG. 5, seven ceramic layers 11 to 17 are shown separated from each other to facilitate the explanation of the structure and manufacturing method of the present invention. However, the ceramic block 10 is integrated in the layer thickness direction (superimposing direction).

In addition, a pair of top and bottom planar electrodes 30 and 30' for discharge are sealed in the ceramic block 10 along the upper and lower sides of the ceramic block 10. A discharge space 20, through which a material gas circulates, is formed between the planar electrodes 30 and 30'. Further, a coolant circulation route 40, through which cooling water serving as a coolant circulates, is formed at the lower side of the ceramic block 10 along the planar electrodes 30 and 30'. A planar ground electrode 50 is sealed between the lower-stage planar electrode 30' and the coolant circulation route 40. Further, the discharge space 20 and coolant circulation route 40 are divided in a direction perpendicular to a fluid circulating direction.

A gas introduction route 21 and gas discharge route 22 for introducing and discharging a material gas to and from the discharge space 20 are respectively formed on the front and rear margins of the ceramic block 10. The gas introduction route 21 and gas discharge route 22 vertically penetrate the ceramic block 10. In addition, a coolant introduction route 41 and coolant discharge route 42 for introducing and discharging a coolant to and from the coolant circulation route 40 are respectively formed on the right and left margins of the ceramic block 10 and vertically penetrate the ceramic block 10.

Among the seven ceramic layers 11 to 17 forming the ceramic block 10, the first ceramic layer 11 (i.e., the top layer) serves as an insulator and the second ceramic layer 12 serves as a dielectric for discharge. The third ceramic layer 13 serves as a spacer for forming the discharge space 20 and the fourth ceramic layer 14 serves as a dielectric for discharge. The fifth ceramic layer 15 serves as an insulator and the sixth ceramic layer 16 serves as a ground. The seventh ceramic layer 17 (i.e., bottom layer) serves as a spacer for forming the coolant circulation route 40. Detailed structures of these ceramic layers are described below.

When the fifth ceramic layer 15, serving as an insulator, has a thickness which is large enough, a leakage of current to the coolant is prevented even if the sixth ceramic layer 16 (serving as a ground) is not used. Therefore, the ceramic layer 6 may be omitted.

In addition, apertures 11a and 11a' for forming the gas introduction route 21 and gas discharge route 22 are respectively formed at the front and rear margins of the first ceramic layer 11. Moreover, apertures 11b and 11b' for forming the coolant introduction route 41 and coolant discharge route 42 are respectively formed at the right and left margins of the first ceramic layer 11. The ceramic layer 11 has a thickness of, for example, 3.0 mm.

Further, the upper surface of the second ceramic layer 12 is covered with the planar electrode 30 made of a conductive thin film. However, the margins of the upper surface are not covered with the planar electrode 30. The planar electrode 30 is a ground electrode and a terminal portion 12c of the ceramic layer 12 laterally protrudes so as to draw a part of the electrode 30 to an outside of the ceramic block 10. Moreover, the lower surface of the ceramic layer 12 is coated with $SiO_2$. In addition, apertures 12a and 12a' for forming the gas introduction route 21 and gas discharge route 22 are respectively formed at the front and rear margins of the ceramic layer 12. Apertures 12b and 12b' for forming the coolant introduction route 41 and coolant discharge route 42 are respectively formed at the right and left margins of the ceramic layer 12. The ceramic layer 12 has a thickness of, for example, 0.3 mm. The planar electrode 30 has a thickness of, for example, 10 to 20 $\mu$m.

A plurality of slits 13d extend from the front to rear margins in the third ceramic layer 13 and form the discharge space 20 in a width direction. In addition, the plurality of slits 13d are placed at equal intervals to form the discharge space 20. Further, the ceramic layer 13 includes apertures 13b and 13b' at the right and left margins, respectively, for forming the coolant introduction route 41 and coolant discharge route 42. Because the gas introduction route 21 and gas discharge route 22 communicate with the discharge space 20, apertures for forming the gas introduction route 21 and gas discharge route 22 are not required. The ceramic layer 13 has a small thickness of, for example, 0.2 mm in order to narrow the gap of the discharge space 20.

The fourth ceramic layer 14 serving as a dielectric is obtained by turning the second ceramic layer 12 inside out. The lower surface of the ceramic layer 14 is covered with the planar electrode 30', made of a conductive thin film. The planar electrode 30' is a high-voltage electrode. To draw a part of the high-voltage electrode to the outside of the ceramic block 10, the ceramic layer 14 includes a laterally protruding terminl portion 14c. In addition, the upper surface of the ceramic layer 14 is coated with $SiO_2$. Further, apertures 14a and 14a' for forming the gas introduction route 21 and the gas discharge route 22 are respectively formed at the front and rear margins of the ceramic layer 14. Similarly, apertures 14b and 14b' for forming the coolant introduction route 41 and the coolant discharge route 42 are respectively formed at the right and left margins of the ceramic layer 14. The ceramic layer 14 has a thickness of, for example, 0.3 mm equal to that of the ceramic layer 12. Moreover, the planar electrode 30' has a thickness of, for example, 10 to 20 $\mu$m equal to that of the ceramic layer 12.

The fifth ceramic layer 15 serving as an insulator is the same as the first ceramic layer 11. Apertures 15a and 15a' for forming the gas introduction route 21 and the gas discharge route 22 are respectively formed at the front and rear margins of the fifth ceramic layer 15. Moreover, apertures 15b and 15b' for forming the coolant introduction route 41 and the coolant discharge route 42 are respectively formed at the right and left margins of the layer 15. The ceramic layer 15 has a thickness of, for example, 3.0 mm equal to that of the ceramic layer 11.

The sixth ceramic layer 16 serving as a ground is the same as the second ceramic layer 12. The upper surface of the ceramic layer 16 is covered with a planar electrode 50. However, the margins of the ceramic layer 16 are not covered with the planer electrode 50. The planar electrode 50 is made of a conductive thin film and serves as a ground. To draw a part of the planar electrode 50 to the outside of the ceramic block 10, the ceramic layer 16 includes a laterally protruding terminal portion 16c. Apertures 16a and 16a' for forming the gas introduction route 21 and the gas discharge route 22 are respectively formed at the front and rear margins of the ceramic layer 16. Apertures 16b and 16b' for forming the coolant introduction route 41 and coolant discharge route 42 are respectively formed at the right and left margins of the ceramic layer 16. The ceramic layer 16 has a thickness of, for example, 0.3 mm equal to that of the ceramic layer 12. The planar electrode 50 has a thickness of, for example, 10 to 20 μm equal to that of the planar electrodes 30 and 30'.

The seventh ceramic layer 17 serving as a spacer for forming the coolant circulation route 40 has a flat shape obtained by rotating 90° the third ceramic layer 13. That is, a plurality of slits 17 extend from one side margin to the other side margin and are in the width direction at equal intervals to form the coolant circulation route 40. Apertures 17a and 17a' for forming the gas introduction route 21 and gas discharge route 22 are respectively formed at the front and rear margins of the ceramic layer 17. Because the coolant introduction route 41 and coolant discharge route 42 communicate with the coolant circulation route 40, apertures for forming the coolant introduction route 41 and coolant discharge route 42 are not required. The ceramic layer 17 has a thickness of, for example, 2.0 mm larger than that of the ceramic layer 13.

The ceramic block 10 is formed by integrating the above seven ceramic layers 11 to 17. The discharge space 20 is formed on the third layer of the ceramic block 10 and the coolant circulation route 40 is formed on the seventh layer of the ceramic block 10. Moreover, the gas introduction route 21 and gas discharge route 22 communicate with the discharge space 20 and penetrate each layer. In addition, the coolant introduction route 41 and coolant discharge route 42 communicate with the coolant circulation route 40 and penetrate each layer.

Further, the upper-stage planar electrode 30 is sealed between the first ceramic layer 11 and the second ceramic layer 12, except at a protruding terminal portion. Similarly, the lower-stage planar electrode 30' is sealed between the fourth ceramic layer 14 and the fifth ceramic layer 15, except at a protruding terminal portion. Further, the planar electrode 50, serving as a ground, is sealed between the fifth ceramic layer 15 and the sixth ceramic layer 16, except at a protruding terminal portion.

In addition, as shown in FIG. 1, the ozonizer is formed by superimposing the above-mentioned discharge cells 100, and setting them between top and bottom end plates 60 and 70. Further, the discharge cells 100 are secured by the end plates 60 and 70 with four tie rods 80. Adjacent discharge cells 100 are joined by an epoxy adhesive or by means of brazing. In the case of brazing, tungsten or the like is baked on both composition planes in order to apply Ni plating to the surfaces. A through-hole for passing the tie rod 80 is formed at four corners of the ceramic layers 11 to 17 of each ceramic block 10.

By superimposing the discharge cells 100, the gas introduction route 21, gas discharge route 22, coolant introduction route 41, and coolant discharge route 42 of each ceramic block 10 respectively communicate with each other. Moreover, the lower side of the coolant circulation route 40 formed on the lower side of each of the first- to third-stage ceramic blocks 10 is closed by the upper side of the corresponding lower-stage ceramic block 10. In addition, the lower side of the coolant circulation route 40 formed on the lower side of the fourth-stage ceramic block 10 is closed by the upper side of the lower-stage end plate 70.

Figure 2A:
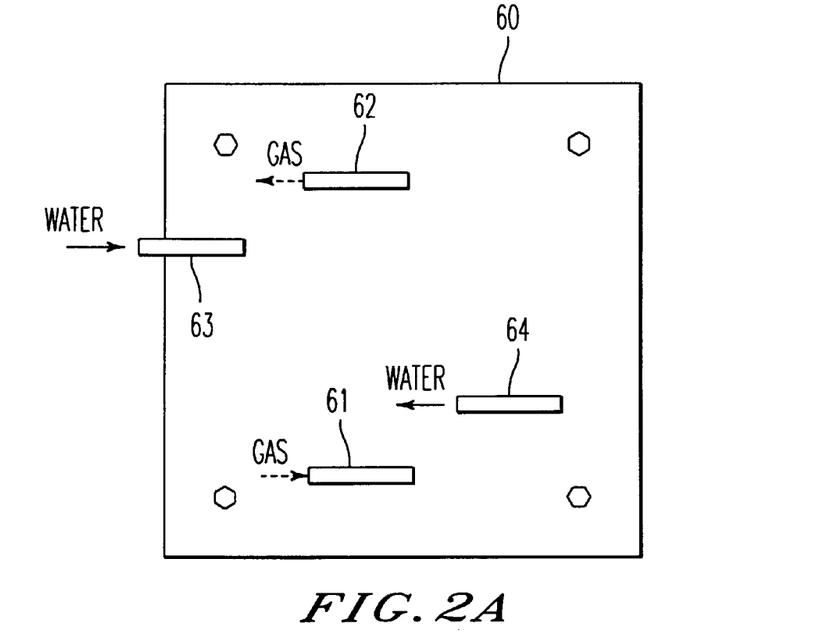
FIGS. 2 is a top view and a bottom view, respectively, of an upper-stage end plate used for the ozonizer in FIG. 1.
Figure 2B:
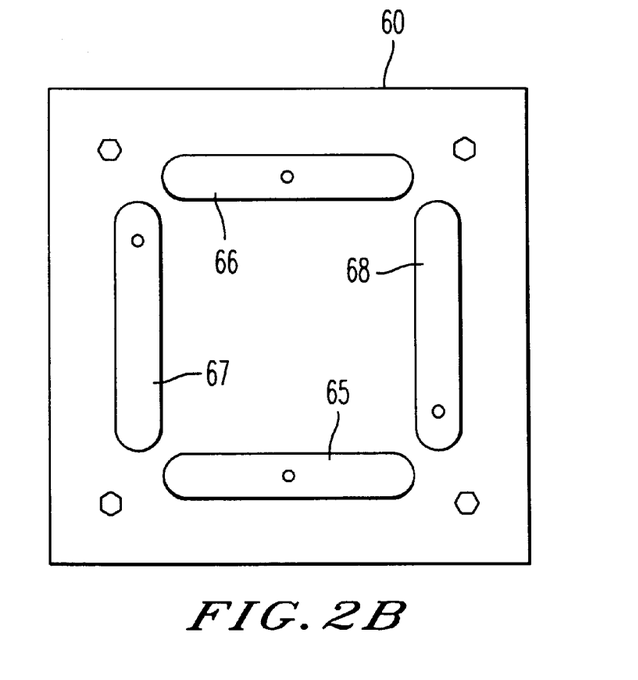

The end plates 60 and 70 are respectively made of a metallic plate, such as a stainless steel plate. Also included in the ozonizer is a gas introduction tube 61, gas discharge tube 62, coolant introduction tube 63, and coolant discharge tube 64 on an upper surface of the upper-stage end plate 60 (see FIG. 2a). Moreover, as shown in FIG. 2b, four concave portions 65, 66, 67, and 68 are formed on the lower surface of the end plate 60. In addition, a through-hole for passing the tie rod 80 is formed at four corners of each of the end plates 60 and 70.

A gas introduction tube 61 communicates with the gas introduction route 21 of each ceramic block 10 through the concave portion 65 formed on the lower surface of the end plate 60. In addition, a gas discharge tube 62 communicates with the gas discharge route 22 of each ceramic block 10 through the concave portion 66 formed on the lower surface of the end plate 60. Further, a coolant introduction tube 63 communicates with the coolant introduction route 41 of each ceramic block 10 through the concave portion 67 formed on the lower surface of the end plate 60. Likewise, a coolant discharge tube 64 communicates with the coolant discharge route 42 of each ceramic block 10 through the concave portion 68 formed on the lower surface of the end plate 60.

The functions of this ozonizer according to the present invention will now be discussed.

For the case of the four discharge cells 100 secured between the end plates 60 and 70, the upper-stage planar electrode 30 and the planar electrode 50 serving as grounds are grounded and the lower-stage planar electrode 30' serving as a high-voltage electrode is connected to the high-voltage terminal of a high-voltage power supply.

For each ceramic block 10, the gas introduction route 21, gas discharge route 22, coolant introduction route 41 and coolant discharge route 42 respectively communicate with each other. Moreover, the lower side of the coolant circulation route 40 formed on the lower side of each of the first- to third-stage ceramic blocks 10 is closed by the upper side of the corresponding lower-stage ceramic block 10. In addition, the lower side of the coolant circulation route 40 formed on the lower side of the fourth-stage ceramic block 10 is closed by the upper side of the lower-stage end plate 70.

Therefore, a material gas introduced into the ozonizer through the gas introduction tube 61 is supplied to the discharge space 20 of each ceramic block 10 and discharged through the gas discharge tube 62. Similarly, cooling water introduced into the ozonizer through the coolant introduction tube 63 is supplied to the coolant circulation route 40 of each ceramic block 10 and discharged through the coolant discharge tube 64.

When operating the high-voltage power supply under the above state, a high voltage is applied between the planar electrodes 30 and 30'. In this case, the planar electrodes 30 and 30' create a silent discharge in the discharge space 20 and a material gas circulating through the discharge space 20 is ozonized. Because the discharge space 20 is divided in a direction perpendicular to a direction the gas is circulating, it is possible to accurately keep a discharge gap size for internal-pressure control or the like. Moreover, it is possible to expect superimposition of discharges due to creeping discharge and thereby, improve a power efficiency and an ozone producing efficiency. Further, because the surfaces of the ceramic layers 12 and 14 contacting the discharge space 20 are coated with $SiO_2$, it is possible to further improve the ozone producing efficiency and stabilize the concentration of ozone. In addition, when the entire surfaces of the ceramic layers 12 and 14 are coated with $SiO_2$, even though a thin $SiO_2$ layer is present between the ceramic layers 12 and 13 and between the ceramic layers 13 and 14, the integrality of the ceramic layers 11 to 17 is not lost because the $SiO_2$ is also a ceramic layer.

Moreover, the planar electrodes 30 and 30' are cooled by the cooling water circulating through the coolant circulation route 40. For the discharge cells shown in FIG. 1, excluding the top-stage discharge cell 100, the planar electrodes 30 and 30' are cooled by the cooling water. For the top-stage discharge cell 100, the planar electrodes 30 and 30' are cooled by the upper-stage end plate 60. Therefore, at each stage of the discharge cell 100, the planar electrodes 30 and 30' are effectively cooled.

In this case, though the lower-stage planar electrode 30' is a high-voltage electrode, a short circuit due to the cooling water does not occur. This is because the planar electrode 50, serving as a ground, is sealed between the ceramic layers 15 and 16 and this arrangement is between the planar electrode 30' and the coolant circulation route 40.

In addition, depending on the thickness of the ceramic layer 15, it is possible to omit the ceramic layer 16 and the planar electrode 50. Moreover, it is possible to provide the coolant circulation route 40 for not only the lower surface of the planar electrodes 30 and 30' but also both the upper and lower surfaces of the planar electrodes 30 and 30'.

The thickness of the discharge cell 100 (e.g., the thickness of the ceramic block 10) is approximately 7 mm. This thickness also includes a cooling portion. For the conventional ozonizer having the same scale, because a heat sink serving as a cooling portion increases the overall thickness, the thickness per cell is approximately 60 mm even when the heat sink is shared by upper and lower discharge cells. However, the discharge cell 100 according to the present invention is very thin.

In addition, the ceramic layer 13 serving as a spacer and for forming the discharge space 20 between the planar electrodes 30 and 30' is not changed in properties or deteriorated in quality even after the ceramic layer 13 contacts ozone for a long period of time.

Further, even if the ceramic block 10 is greatly tightened by the tie rods 80 in the thickness direction, it is not broken because a tightened-portion thickness of approx. 7 mm is secured.

Because the ceramic layer 13 for forming the discharge cell 20 is integrated with the upper and lower ceramic layers 12 and 14, a high airtightness of the discharge cell 10 is achieved. Therefore, it is possible to raise the pressure of a material gas.

Next, a manufacturing method of the discharge cell 100 is described.

The ceramic block 10 is manufactured by superimposing ceramic sheets before they are baked. The ceramic sheets (i.e., ceramic layers) at this stage are respectively referred to as a green ceramic sheets. Then the superimposed ceramic green sheets are baked.

In more detail, a punching process is used for forming apertures for the gas and coolant introduction discharge routes. The punching process is applied to the green ceramic sheets corresponding to the first and fifth ceramic layers 11 and 15 of the ceramic block 10. Similarly, the punching process is used for forming an aperture for the circulation route corresponding to the second, fourth, and sixth ceramic layers 12, 14, and 16 of the ceramic block 10. In addition, a paste for forming an electrode is applied to the ceramic sheets by means of screen printing. Moreover, $SiO_2$ is applied to the surfaces of the ceramic layers 12 and 14 at their anti-electrode side. Also, the apertures for forming the gas and coolant introduction and discharge routes are applied to the green ceramic sheets corresponding to the third and seventh ceramic layers 13 and 17 of the ceramic block 10. The punching process is a preferable method of producing the above apertures. However, other appropriate methods may be used.

The green ceramic sheets are superimposed and integrated by a press while they are heated up to approximately 100° C., and thereafter heated up to approx 1500° C. in a reducing atmosphere to bake the ceramic.

Thereby, the ceramic block 10 is completed and the discharge cell 100 is manufactured. The usage of the manufactured discharge cell 100 is already described above.

Thus, the discharge cell 100 can be easily manufactured. Moreover, the discharge cell 100 is suitable for mass production. Further, because it is possible to machine a spacer into an optional shape, the degree of freedom for designing the discharge space 20 is improved. For the discharge space 20 divided in the direction perpendicular to the circulating direction, improvement of power efficiency by creeping discharge, improvement of ozone producing efficiency, and stabilization of ozone concentration can be expected as described above.

It is preferable to use a ceramic sheet having an alumina purity of 90% or more for integrally baking with an electrode. In addition, it is possible to use paste mainly containing tungsten, molybdenum, or silver to form an electrode.

FIG. 6 is a perspective view of the discharge cell of another embodiment of the present invention, and FIG. 7 is an exploded perspective view of the discharge cell in FIG. 6.

This discharge cell is formed by bonding two ceramic blocks 10A and 10B through a glass layer 90. The ceramic block 10A is formed with the above-described ceramic layers 11 and 12 and the ceramic block 10B is formed with the above-described ceramic layers 14, 15, 16 and 17. The glass layer 90 serves as a spacer and for forming the discharge space 20. The glass layer 90 is also used as a bonding layer. That is, this discharge cell uses the glass layer 90 instead of the ceramic layer 13 for forming the discharge space 20.

This discharge cell is manufactured by the following method. The ceramic blocks 10A and 10B are manufactured by using a ceramic sheet. The lower surface of the ceramic block 10A and the upper side of the ceramic block 10B are coated with $SiO_2$. The coating method can use a method of thermally spraying $SiO_2$ on the lower surface of the ceramic block 10A and the upper surface of the ceramic block 10B after the ceramic blocks 10A and 10B are baked. Moreover, to form the glass layer 90, a thin glass plate having a thickness of 0.05 mm is punched into a spacer shape and a low-melting-point glass for bonding the ceramic blocks 10A and 10B is applied to both sides of the glass layer 90. Finally, the ceramic blocks 10A and 10B are bonded together using the glass layer 90.

The discharge cell thus manufactured makes it possible to decrease the gap size of the discharge space 20 to 0.1 $\mu$m or less. Moreover, because the ceramic blocks 10A and 10B are strongly bonded to each other, it is possible to obtain the same function as that of the ceramic block 10. It is also possible to use print baked glass instead of the glass plate. Further, it is possible to form a very thin spacer through thermally spraying a desired ceramic sheet.

As described above, an ozonizer discharge cell of the present invention is formed by integrally superimposing a plurality of ceramic layers on each other. Therefore, the entire cell including a spacer portion is extremely superior in durability and also has a high mechanical strength. Moreover, because a high airtightness can be provided for a discharge space, it is possible to use a high material-gas pressure. Furthermore, because the cell is compact and achieves a high cooling efficiency, a high ozone producing efficiency is obtained.

Further, a discharge cell manufacturing method of the present invention makes it possible to easily manufacture a compact, high-performance, and high-quality ozonizer discharge cell and to decrease the manufacturing cost.

Obviously, numerous modifications and variations of the present invention are possible in light of the above teachings. It is therefore to be understood that within the scope of the appended claims, the invention may be practiced otherwise than as specifically described herein.

What is claimed as new and is desired to be secured by Letters Patent of the United States is:

1. An ozonizer discharge cell, comprising:
    a pair of planar electrodes separated by a dielectric to ozonize a material gas circulating through a discharge space formed between one of said planar electrodes and said dielectric by means of discharge; and
    said dielectric comprising at least one ceramic block including a plurality of ceramic layers integrally superimposed on each other in a layer thickness direction,
    wherein said at least one ceramic block includes a gas introduction route and a gas discharge route passing through said plurality of ceramic layers in said layer thickness direction and communicating with said discharge space,
    wherein said at least one ceramic block includes a coolant introduction route and a coolant discharge route passing through said plurality of ceramic layers in said layer thickness direction and communicating with a coolant circulation route,
    wherein the coolant circulation route is insulated from said planar electrodes by an insulating ceramic layer disposed between said coolant circulation route and said planar electrodes,
    wherein said at least one ceramic block comprises two ceramic layers and an intermediate ceramic layer disposed between said two ceramic layers, and
    wherein said discharge space is formed between said two ceramic layers.

2. The discharge cell according to claim 1, wherein said discharge space includes a plurality of sub-discharge spaces in a direction substantially perpendicular to a direction said gas is circulating along said plurality of ceramic layers.

3. The discharge cell according to claim 1, wherein said dielectric comprises a ceramic layer facing said discharge space.

4. The discharge cell according to claim 3, comprising a $SiO_2$ coating provided on a surface of said ceramic layer facing said discharge space.

5. The discharge cell according to claim 1, wherein one of said plurality of ceramic layers is adjacent to said discharge void and includes one of said planar electrodes on a surface thereof opposite said discharge void.

6. The discharge cell according to claim 1, comprising two adjacent ceramic layers sealing one of said planar electrodes.

7. The discharge cell according to claim 1, wherein said planar electrodes comprise a conductive thin film.

8. A method of manufacturing an ozomzer discharge cell, comprising:
    providing a plurality of ceramic sheets to be baked;
    superimposing said plurality of ceramic sheets in a layer thickness direction;
    baking said plurality of ceramic layers so as to form a ceramic block,
    wherein said at least one ceramic block includes a gas introduction route and a gas discharge route passing through said plurality of ceramic layers in said layer thickness direction and communicating with said discharge space,
    wherein said at least one ceramic block includes a coolant introduction route and a coolant discharge route passing through said plurality of ceramic layers in said layer thickness direction and communicating with a coolant circulation route,
    wherein the coolant circulation route is insulated from said planar electrodes by an insulating ceramic layer disposed between said coolant circulation route and said planar electrodes,
    wherein said at least one ceramic block comprises two ceramic layers and an intermediate ceramic layer disposed between said two ceramic layers, and
    wherein said discharge space is formed between said two ceramic layers.

9. The method according to claim 8, wherein said step of providing provides a plurality of ceramic sheets each of which includes 90% or more of alumina.

10. The method according to claim 8, further comprising:
    printing electrode forming paste to a surface of a specific ceramic sheet before said step of superimposing said plurality of ceramic layers.

11. The method according to claim 10, wherein said step of printing prints an electrode forming paste comprising a material selected from the group consisting of tungsten, molybdenum, and silver.

* * * * *

UNITED STATES PATENT AND TRADEMARK OFFICE
CERTIFICATE OF CORRECTION

PATENT NO. : 6,284,203 B1
DATED : September 4, 2001
INVENTOR(S) : Tokutake et al.

It is certified that error appears in the above-identified patent and that said Letters Patent is hereby corrected as shown below:

<u>Title page,</u>
Item [30], Foreign Application Priority information should read
-- (30) Foreign Application Priority Data
   Mar. 24, 1998    (JP)......................................10-096702

Signed and Sealed this

Twenty-third Day of April, 2002

Attest:

JAMES E. ROGAN
Attesting Officer    Director of the United States Patent and Trademark Office